UNITED STATES PATENT OFFICE.

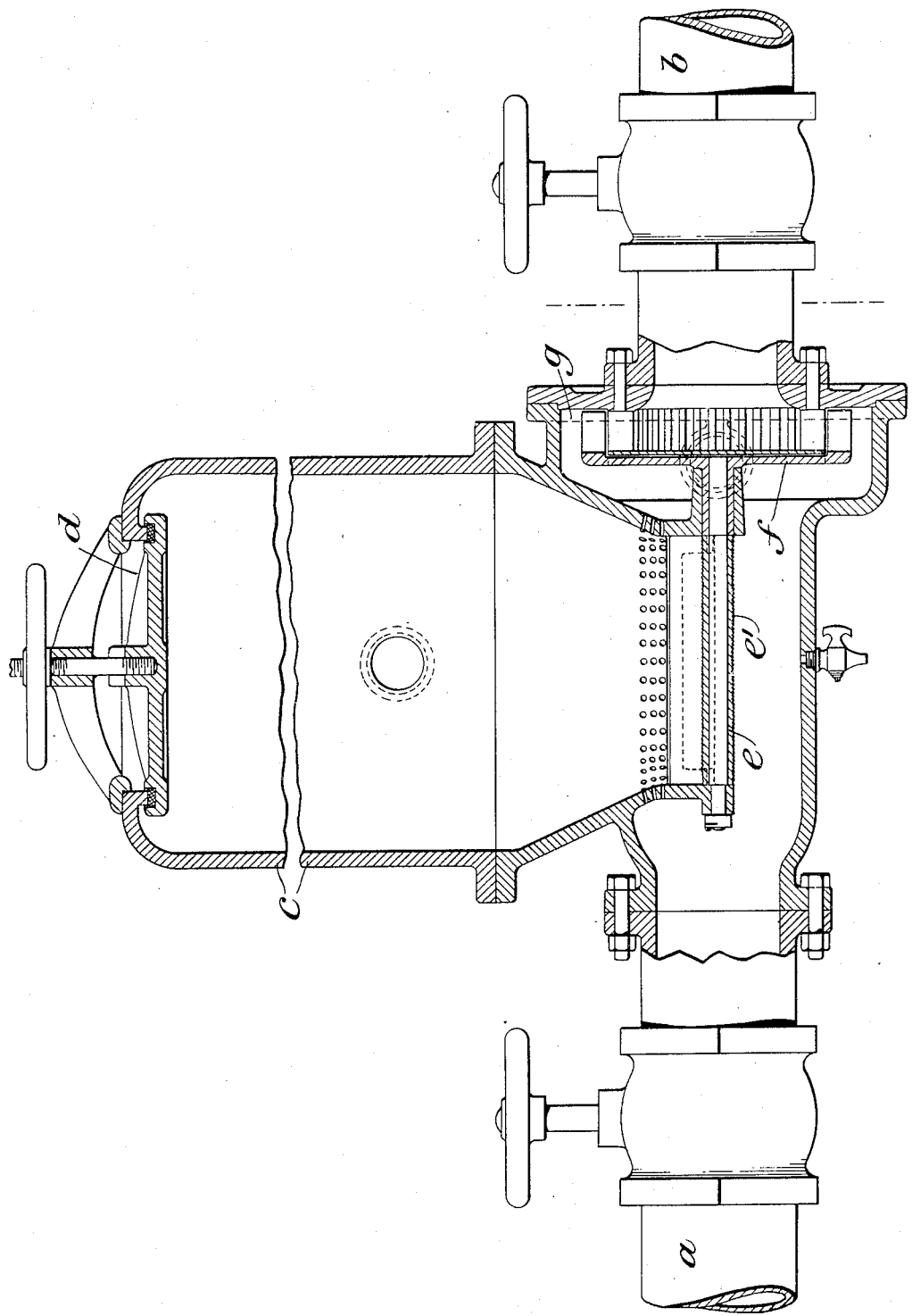

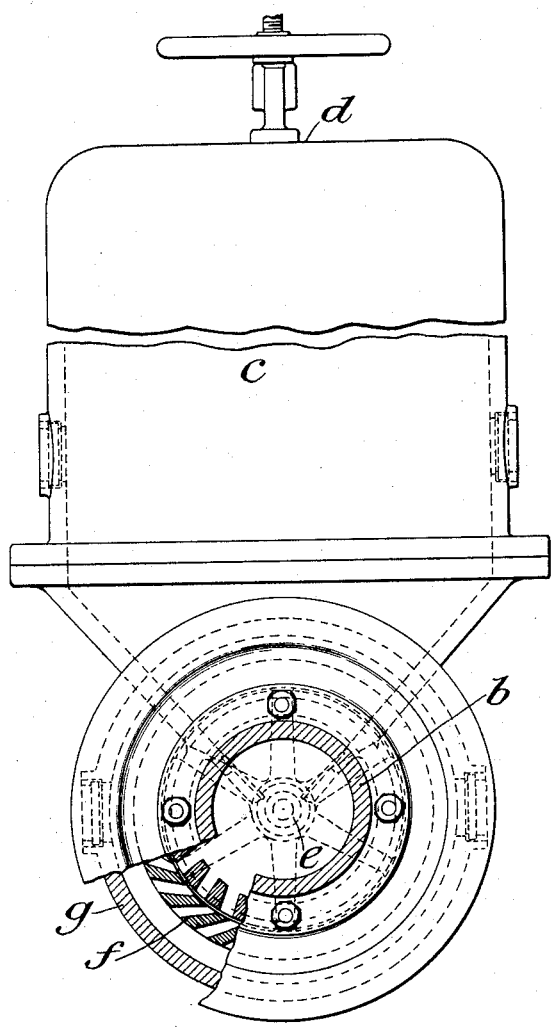

JOSEPH SCHNEIBLE, OF WEEHAWKEN, NEW JERSEY.

TREATMENT OF REFRACTORY WATER.

No. 820,524.

Specification of Letters Patent.

Patented May 15, 1906.

Application filed May 3, 1905. Serial No. 258,619.

*To all whom it may concern:*

Be it known that I, JOSEPH SCHNEIBLE, a citizen of the United States, residing in Weehawken, in the county of Hudson, in the State of New Jersey, have invented certain new and useful Improvements in the Treatment of Refractory Water, of which the following is a specification, reference being had to the accompanying drawings, forming a part hereof.

It has been discovered heretofore that the presence of finely-divided talc or other similar substance in water will prevent the concretion of the mineral substances which sometimes, especially when the dissolved mineral bases, &c., become insoluble by heating or otherwise, cause trouble through the formation of scale upon the walls of the containing vessel or conductor, and particularly upon the walls of steam boilers, heaters, condensers, coolers, piping, &c. Various attempts to take advantage of this fact have been made, but such attempts have not been commercially successful. Thus it has been proposed to add by hand and from time to time a quantity of pulverized soapstone to the water in the hot-well of a boiler and to agitate the same until it has been taken into the boiler; but this method cannot be practiced continuously, is not adapted to all conditions of use, and is uncertain, permitting at times the addition of too much of the soapstone and at other times of too little.

By the present invention it has been sought to provide for the continuous treatment of the refractory water as it flows from the source of supply to the place of use, adding and mixing a quantity of the finely-divided talc or other similar material continuously as the water flows and making the quantity of the talc-like material added proportional always to the quantity of water. This result is most conveniently accomplished with an apparatus interposed in the supply-pipe and comprising a device which is driven by the water as it flows, and therefore at a speed proportionate to the volume of water passing, and as it is driven transfers in a finely-divided condition a quantity of the talc-like material from a suitable supply and adds it to and mixes it with the flowing water.

The invention, particularly as to the apparatus, will be more fully described hereinafter with reference to the accompanying drawing, in which such apparatus is illustrated, and in which—

Figure 1 is a longitudinal section of the apparatus; and Fig. 2 is an end elevation thereof, partly broken out or in section, to show details of construction.

In the embodiment of the invention illustrated in the drawings the source of supply of the refractory water to be treated is sufficiently indicated by the pipe $a$, and the boiler or other place of use of the water after treatment by the pipe $b$, which may lead thereto. A hopper or container $c$, provided with a hand-hole $d$, is arranged to receive a quantity of the soapstone or other material in a suitable condition for the operation of the apparatus, either in a finely-divided condition for transfer to the water or in a coarser condition requiring to be disintegrated or reduced to a finely-divided condition as it is transferred to the water. As shown in the drawings, the hopper is provided in its lower portion with suitable bearings for a disintegrating-roll $e$, which is preferably armed with a somewhat sharply-roughened or brush-like surface, as at $e'$, to transfer as it rotates some of the soapstone in a finely-divided condition from the container to the flowing water. Suitable means are provided for rotating the roll. Thus, as shown in the drawings, there is at one end of the roll and, if desired, secured directly to the shaft thereof, a turbine-wheel $f$, arranged to rotate in a suitable casing $g$, through which the water passes on its way from the source of supply to the place of use, so that the transferring-roll is operated by the water in its passage and at a speed proportionate to the quantity of water passing. In this manner and by such means the soapstone is slowly reduced to a finely-divided condition, if necessary, and is transferred and added continuously to the water in its passage, being added more rapidly as the quantity of water flowing through the supply-pipe in a given time is increased. It will be obvious that various forms of apparatus might be devised to accomplish the purpose herein described and in substantially the same manner, and it is therefore to be understood that the invention is not limited to any particular form of apparatus, except as may be specified in the accompanying claims. It will also be understood that cold water can be treated in this manner as well as hot, and with reference to its subsequent use either cold or hot.

I claim as my invention—

1. An apparatus for the treatment of refractory water comprising a container for talc-like material, means to supply the water in a flowing stream and devices to disintegrate and transfer talc-like material in a finely-divided condition from the container to the flowing stream of water, substantially as shown and described.

2. An apparatus for the treatment of refractory water comprising a container for talc-like material in communication with the water-supply, devices for disintegrating and transferring talc-like material in a finely-divided condition from the container to the flowing stream of water, and means operated by the water as it passes from the source of supply to the place of use to operate said disintegrating devices, substantially as shown and described.

3. An apparatus for the treatment of refractory water comprising a container for talc-like material in communication with the water-supply, a disintegrating and transferring roll to act upon the talc-like material, and means operated by the flowing water as it passes from the source of supply to the place of use to drive said roll, substantially as shown and described.

4. An apparatus for the treatment of refractory water comprising a container for the reception of talc-like material in communication with the water-supply, a disintegrating and transferring roll to act upon the talc-like material and transfer it in a finely-divided condition from the container to the water-supply, and a turbine operatively connected with said roll and driven by the water in its passage from the source of supply to the place of use, substantially as shown and described.

This specification signed and witnessed this 24th day of April, 1905.

JOSEPH SCHNEIBLE.

In presence of—
ANTHONY N. JESBERA,
M. A. BRAYLEY.